(12) United States Patent
Dewulf et al.

(10) Patent No.: US 10,205,152 B2
(45) Date of Patent: Feb. 12, 2019

(54) BUSHING FORMING A TERMINAL FOR A LITHIUM STORAGE BATTERY AND RELATED STORAGE BATTERY

(71) Applicant: COMMISSARIAT A L'ENERGIE ATOMIQUE ET AUX ENERGIES ALTERNATIVES, Paris (FR)

(72) Inventors: Frederic Dewulf, Voiron (FR); Pierre Jost, Vizille (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 322 days.

(21) Appl. No.: 14/397,053

(22) PCT Filed: Apr. 23, 2013

(86) PCT No.: PCT/IB2013/053184
§ 371 (c)(1),
(2) Date: Oct. 24, 2014

(87) PCT Pub. No.: WO2013/160820
PCT Pub. Date: Oct. 31, 2013

(65) Prior Publication Data
US 2015/0118547 A1 Apr. 30, 2015

(30) Foreign Application Priority Data
Apr. 24, 2012 (FR) ...................................... 12 53767

(51) Int. Cl.
*H01M 2/30* (2006.01)
*H01M 2/06* (2006.01)
(Continued)

(52) U.S. Cl.
CPC ............... *H01M 2/30* (2013.01); *H01M 2/06* (2013.01); *H01M 2/08* (2013.01); *H01M 4/502* (2013.01);
(Continued)

(58) Field of Classification Search
None
See application file for complete search history.

(56) References Cited

U.S. PATENT DOCUMENTS

2006/0051665 A1   3/2006   Rigobert et al. .............. 429/179

FOREIGN PATENT DOCUMENTS

| EP | 1 653 530 | 8/2005 |
| FR | 2798227 | 9/1999 |

OTHER PUBLICATIONS

English translation of FR2798227—2001.*
English translation of EP1653530—2006.*
English Translation of FR2798227.

* cited by examiner

*Primary Examiner* — Lucas J. O'Donnell
(74) *Attorney, Agent, or Firm* — Norton Rose Fulbright US LLP

(57) ABSTRACT

The present invention relates to a bushing forming a terminal for a storage battery, made through an opening connecting to either side of a wall comprising two opposing surfaces, which comprises: two electrically insulating washers, each comprising a bearing portion resting by the surface thereof under pressure against one of the surfaces of the wall and a guiding portion projecting from the bearing portion and resting under pressure against the edge of the opening; two electrically conductive parts, in which a male part is adjusted clamped inside the female part, each one of the parts comprising a bearing portion resting by the surface thereof under pressure against a bearing portion of the
(Continued)

washers, the female part resting by the surface thereof under pressure against the guiding portions of the washers. The material(s) of the parts is/are fitted, and the section(s) thereof is/are sized so as to enable the flow of an electric current with a value of no less than 100 A.

16 Claims, 4 Drawing Sheets

(51) Int. Cl.
*H01M 2/08* (2006.01)
*H01M 4/50* (2010.01)
H01M 10/0525 (2010.01)
H01M 4/485 (2010.01)
H01M 4/58 (2010.01)
H01M 4/505 (2010.01)
H01M 4/525 (2010.01)

(52) U.S. Cl.
CPC ............ *H01M 4/485* (2013.01); *H01M 4/505* (2013.01); *H01M 4/525* (2013.01); *H01M 4/5825* (2013.01); *H01M 10/0525* (2013.01); *Y02E 60/122* (2013.01); *Y10T 29/49108* (2015.01)

BUSHING FORMING A TERMINAL FOR A LITHIUM STORAGE BATTERY AND RELATED STORAGE BATTERY

CROSS-REFERENCE TO RELATED APPLICATIONS

This application is a national phase application under 35 U.S.C. § 371 of International Application No. PCT/IB2013/053184 filed 23 Apr. 2013, which claims priority to French Patent Application No. 1253767 filed 24 Apr. 2012. The entire contents of each of the above-referenced disclosures is specifically incorporated herein by reference without disclaimer.

TECHNICAL FIELD

The present invention relates to a bushing forming a terminal for a lithium storage battery, such as a lithium-ion storage battery, and to such a storage battery.

The invention relates more particularly to a lithium-ion (Li-ion) storage battery with a high capacity, typically more than 10 ampere-hours (Ah), and having a capability for the flow of heavy currents, typically more than 100 A.

The invention more particularly relates to the production of a bushing of a housing making it possible for the high-capacity Li-ion storage battery equipped therewith to be able to deliver heavy currents.

By "bushing", it is to be pointed out that the usual sense is intended, that is to say a device used to pass an electrically conductive element through a wall while insulating the conductor from this wall.

PRIOR ART

As schematically represented, a lithium-ion battery or storage battery usually comprises at least one electrochemical cell consisting of an electrolyte constituent between a positive electrode, or cathode, and a negative electrode, or anode, a current collector connected to the cathode, a current collector connected to the anode and, lastly, a package intended to contain the electrochemical cell in a leaktight fashion while some of the current collectors pass through it.

The electrolyte constituent may be in the form of a solid, liquid or gel. In the latter form, the constituent may comprise a separator made of polymer or microporous composite, impregnated with electrolyte(s) of the organic type or of the ionic liquid type, which allows the lithium ion to move from the cathode to the anode for charging and in the reverse direction for discharging, which generates the current. The electrolyte is generally a mixture of organic solvents, for example carbonates to which a lithium salt, typically $LiPF_6$, is added.

The positive electrode, or cathode, consists of materials with lithium cation intercalation, which are generally composites, such as $LiFePO_4$, $LiCoO_2$, $LiNi_{0.33}Mn_{0.33}Co_{0.33}O_2$.

The negative electrode, or anode, very often consists of graphite carbon or $Li_4TiO_5O_{12}$ (titanate material), optionally also based on silicon or silicon-based composite.

The current collector connected to the positive electrode is generally made of aluminum.

The current collector connected to the negative electrode is generally made of copper, nickel-plated copper or aluminum.

A lithium-ion battery or storage battery may, of course, comprise a plurality of electrochemical cells which are stacked on one another.

Traditionally, an Li-ion battery or storage battery uses a pairing of materials at the anode and at the cathode which allow it to operate with a high voltage level, typically equal to 3.6 volts.

A Li-ion battery or storage battery comprises a rigid package when the applications envisioned are robust and a long lifetime is desired, for example with much higher pressures to be withstood and a more stringent required level of leaktightness, typically below $10^{-8}$ mbar·l/s, or in very demanding environments, such as the aeronautical or space sectors.

Furthermore, to date a rigid package has consisted of a metal housing, typically made of stainless steel (inox 316L or inox 304), aluminum (Al 1050 or Al 3003) or titanium.

Currently, two types of rigid housing are manufactured.

The first type consists of a rigid housing, made with a machined bottom and a cover, which are laser-welded to one another at their periphery. The current collectors consist partly of metal wires or pins. The pin or pins is (are) welded by electrical or ultrasonic welding to the corresponding current collector part, which is itself connected to one of the electrodes of an electrochemical cell or of a stack of electrochemical cells. In order to establish electrical insulation between the metal cover of the housing and the metal pin, a glass bead encapsulates the pin, thus constituting what is commonly referred to as a glass/metal bushing (GMB). Furthermore, in order to establish leaktightness with the cover of the housing, a ring around the glass bead, and generally made of the same metal as the housing, is welded to the latter. Certain configurations make it possible to use a single GMB, the housing constituting the other terminal, also referred to as a pole, of the storage battery.

The second type also consists of a rigid housing, made with a crimped cup and a cover, which are laser-welded to one another at their periphery. Conversely, the current collectors comprise a bushing with a part which projects on the top of the housing and forms an emergent terminal, also referred to as a pole, of the battery.

A first assembly example of such a bushing 1 forming a terminal with the current collector 2 and with the cover 3 of a housing is shown in FIG. 1: the collector 2, typically made of copper, in the form of an internally threaded male piece, is fixed by screwing with the aid of a nut 2 of the M5 or M8 type. Two washers 5A, 5B made of electrically insulating material, typically polypropylene, and placed on one another are interposed, one 5A between the cover 3 and the other bearing washer 6 of the nut 4, and the other 5B between the cover 3 and the collector 2. These washers 5A, 5B establish the leaktightness and electrical insulation of the collector 2 with respect to the housing cover 3. More precisely, in this first example illustrated, the two insulating washers 5A, 5B are identical and each comprise a bearing portion 50A, 50B and a guiding and centering portion 51A, 51B. The bearing portion 50A bears with its surface under pressure both against the face 30 of the wall of the cover 3 and against the bearing washer 6 of the nut 4. Similarly, the bearing portion 50B bears with its surface both against the opposite face 31 of the cover 3 and against the bearing portion 20 of the current collector 2. The guiding and centering portions 51A, 51B, for their part, bear with their surface under pressure both against the edge of the orifice 32 passing through the cover 2 and against the collector 2. These guiding and centering portions 51A, 51B make it possible to guide and center both the washers 5A, 5B in the through-orifice 32 and the male collector 2 in said washers 5A, 5B.

A second assembly example of a bushing 1 forming a terminal with the current collector 2 and with the cover 3 of a housing is shown in FIG. 2: the collector 2, typically made of copper, in the form of an internally threaded male piece, is fixed by crimping the collector on the bearing washer 6. Here again, there are the two washers 5A, 5B made of electrically insulating material, with their bearing portions 50A, 50B and their guiding and centering portions 51A, 51B, which are arranged in an identical way and fulfil the same functions as in the first example. Conversely, the fastening by crimping according to this second example is carried out without using an additional piece, such as the screwing nut 4 of the first example. This is because the crimping is carried out by mechanically crushing a crimping portion 21, arranged on the outside of the cylindrical part of the collector 2, against the bearing washer 6.

A third assembly example of a bushing forming a terminal with the current collector and with the cover of a housing is described in the Patent Application FR 2798227.

As mentioned above, an Li-ion battery or storage battery uses a pairing of materials at the anode and at the cathode allowing it to operate at a high voltage level, typically equal to 3.6 volts.

Other material pairings, delivering a lower voltage level, are possible. For example, a material pairing of $LiFePO_4$/graphite delivers a medium voltage level of between 3.0 and 3.2 volts during operation. Also by way of example, a material pairing of $LiFePO_4/Li_4TiO_5O_{12}$ delivers a medium voltage level of between 1.6 and 1.8 volts during operation.

The Inventors have been confronted with a need to propose an Li-ion storage battery provided with a housing, with the connection terminals, making it possible to pass very heavy currents, typically more than 100 A, with medium voltage levels lower than that equal to 3.6 volts which is typically used. This is because, for so-called power applications, a high-capacity storage battery must deliver at its terminals a very high power, that is to say a product of the current and voltage which are very high. Because of the use of pairings with lower voltage levels, however, it is necessary to deliver heavier currents than traditionally.

The Inventors have come to the conclusion that none of the bushings, proposed according to the prior art through a package housing of an Li-ion storage battery, such as those mentioned above, is suitable for passing very heavy currents, typically more than 100 A. In particular, the solution proposed in the aforementioned Application FR 2798227 is not suitable for passing heavy currents, because doing so would entail generating a loss of contact by decohesion between the male piece and the female piece during heating, which leads to thermal expansions, in particular because of the geometries of said pieces and the absence of laser welding, etc.

Furthermore, whatever the type of assembly envisioned, it is necessary to provide perfect leaktightness of the bushing, and to do so throughout the working life of an li-ion storage battery, typically more than 5 years.

There is therefore a need to improve a bushing forming a terminal for a lithium-ion storage battery and formed through a housing of the storage battery, in particular with a view to allowing a high-capacity storage battery equipped therewith to be able to deliver heavy currents, and with a view to obtaining perfect leaktightness of the bushing, and doing so throughout its working life.

SUMMARY OF THE INVENTION

To this end, according to one of its aspects, the invention relates to a bushing forming a terminal for a lithium-ion (Li-ion) storage battery, formed through an orifice opening on either side of a wall having two opposite faces, comprising:

two electrically insulating washers, each having a bearing portion bearing with its surface under pressure against one of the faces of the wall, and a guiding portion projecting from the bearing portion, the guiding portion bearing with pressure against the edge of the orifice of the wall, two electrically conductive pieces, of which a male piece is fitted tightly in the female piece, each of the conductive pieces having a bearing portion bearing with its surface under pressure against a bearing portion of the washers, the female piece furthermore bearing with its surface under pressure against the guiding portions of the washers, in which bushing the material(s) of the pieces is (are) adapted, and their cross sections are dimensioned, in order to allow an electric current with a value at least equal to 100 A to flow through.

In other words, according to the invention, the following are carried out in combination:

tight fitting between male and female electrical connection pieces, which allows both axial compression (along the axis of the bushing) of the two insulating washers and radial tightening of the male and female pieces between one another and of the two insulating washers between the female piece and the edge of the orifice, which ensures perfect leaktightness and very good mechanical holding of the bushing on the wall;

selection of material(s) of the male and female pieces and of their cross sections in order to allow heavy currents to flow through the bushing.

The term "perfect leaktightness" is intended to mean leaktightness at a level among the most stringent required, typically to below $10^{-8}$ mbar·l/s for helium.

Advantageously, the material(s) of the pieces may be adapted, and their cross sections are dimensioned, in order to allow an electric current with a value at most equal to 500 A to flow through.

According to an advantageous embodiment, the female piece is open and is welded by a continuous weld bead to the male piece on the emergent end of the latter. The term "emergent end" is intended to mean the end of the male piece visible on the side of the female piece when the tight fitting is carried out. The welding may be electrical or carried out using a laser. Such an embodiment is advantageous because it allows permanent reinforcement of the mechanical connection between the end of the male piece and the base of the female piece. Furthermore, a continuous weld bead is perfectly leaktight and will supplement and ensure the perfect leaktightness of the bushing of the wall according to the invention, and will do so throughout the working life of the Li-ion storage battery. Further to the leaktightness, the welding will ensure mechanical cohesion in relation to the thermal expansions caused by the heating of the terminal under the effect of heavy current. Preferably, according to this advantageous embodiment, the arrangement of the male piece in the female piece is such that the height difference between the end of the male piece and the end of the female piece is less than 0.3 mm, whether the male piece projects or is set back relative to the female piece. In particular, provision is advantageously made for the ends of the male and female pieces to define a plane surface, that is to say with a substantially zero height difference between them. Such an arrangement, with a very small height difference, makes it possible to promote on the one hand welding of the male and female pieces to one another and, on the other hand, subsequent welding of the connection means.

Preferably, the male and female pieces are made of the same material. They may be made of electrolytic copper CuAl or of copper weakly alloyed with tellurium, CuTe.

The insulating washers may advantageously be made of polyetherimide (PEI), the mechanical and thermal properties of which are compatible with a heavy current flow.

Preferably, the contact cross section S1 between the male piece and the female piece is greater than 8 mm$^2$, preferably greater than 10 mm$^2$.

Also preferably, the smallest cross section S2 of the male piece is greater than 8 mm$^2$, preferably greater than 10 mm$^2$.

According to another of its aspects, the invention also relates to a bushing forming a terminal for a lithium-ion (Li-ion) storage battery, formed through an orifice opening on either side of a wall having two opposite faces, comprising:
- two electrically insulating washers, each having a bearing portion bearing with its surface under pressure against one of the faces of the wall, and a guiding portion projecting from the bearing portion, the guiding portion bearing with pressure against the edge of the orifice of the wall,
- two electrically conductive pieces, of which a male piece is fitted tightly in the female piece, each of the conductive pieces having a bearing portion bearing with its surface under pressure against a bearing portion of the washers, the female piece furthermore bearing with its surface under pressure against the guiding portions of the washers,
in which bushing the female piece is open and is welded by a continuous weld bead to the male piece on the emergent end of the latter.

According to yet another aspect, the invention also relates to a lithium-ion (Li-ion) battery or storage battery comprising a housing with a cover through which a bushing as described above is formed.

According to one characteristic, the male piece is of the internally threaded type and projects outside the housing.

The cover may be made of aluminum, such as aluminum 1050 or 3003.

The material of the negative electrode(s) may be selected from the group comprising graphite, lithium, titanate oxide $Li_4TiO_5O_{12}$; and the material of the positive electrode(s) may be selected from the group comprising $LiFePO_4$, $LiCoO_2$, $LiNi_{0.33}Mn_{0.33}Co_{0.33}O_2$.

Lastly, the invention relates to a method for producing a bushing as described above, according to which the following steps are carried out:
- a/ insertion through the orifice, from each of the two opposite faces of the wall, of one of the guiding portions of the washers, in such a way that they bear against the edge of the orifice of the wall,
- b/ insertion, from one face of the wall, of the female piece into one of the washers;
- c/ force-fitting, from the opposite face of the wall, of the male piece, in such a way that each of the bearing portions of the male and female pieces bears under pressure against a bearing portion of the washers, which itself bears with pressure against the edge of the orifice, the female piece furthermore bearing with pressure against the guiding portions of the washers, which themselves bear under pressure against the edge of the orifice of the wall.

The force-fitting which allows bearing with pressure, according to step c/ is advantageously carried out by pressing with a force greater than or equal to 1 metric tonne-force.

DETAILED DESCRIPTION

Other advantages and characteristics of the invention will become clearer on reading the details description of exemplary embodiments of the invention, provided by way of illustration and without implying limitation with reference to the appended figures, in which.

Figure 1:
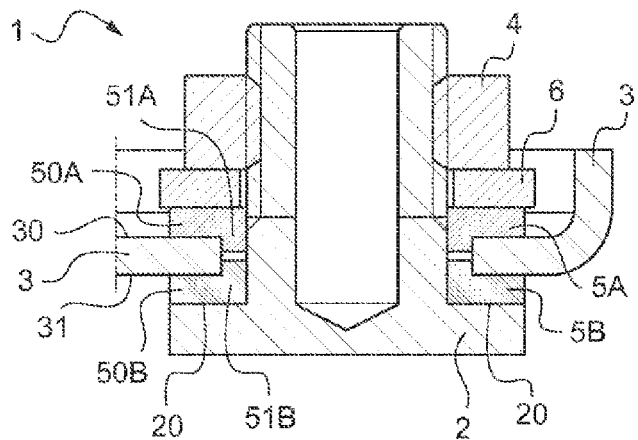
FIG. 1 is a view in axial section of a bushing forming a terminal of an Li-ion storage battery according to one example of the prior art.
Figure 2:
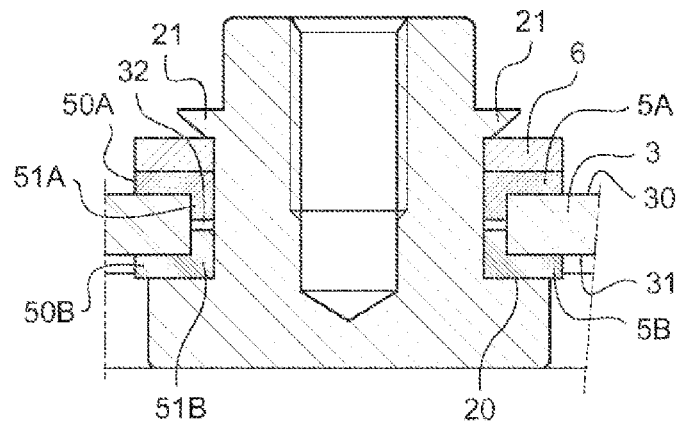
FIG. 2 is a view in axial section of a bushing forming a terminal of an Li-ion storage battery according to another example of the prior art.

FIGS. 1 and 2 relate to two different examples of a bushing forming a terminal of an Li-ion storage battery according to the prior art. These FIGS. 1 and 2 have already been discussed in the introduction, and are therefore not discussed below.

For the sake of clarity, references which are the same, denoting the same elements of bushings according to the prior art and according to the invention, are used for all of FIGS. 1 to 6.

In the rest of the present application, the terms "lower", "upper", "low", "high", "below" and "above" are to be understood with reference to an Li-ion storage battery housing positioned vertically with its cover on top and the bushing projecting upward out of the housing.

Figure 3:
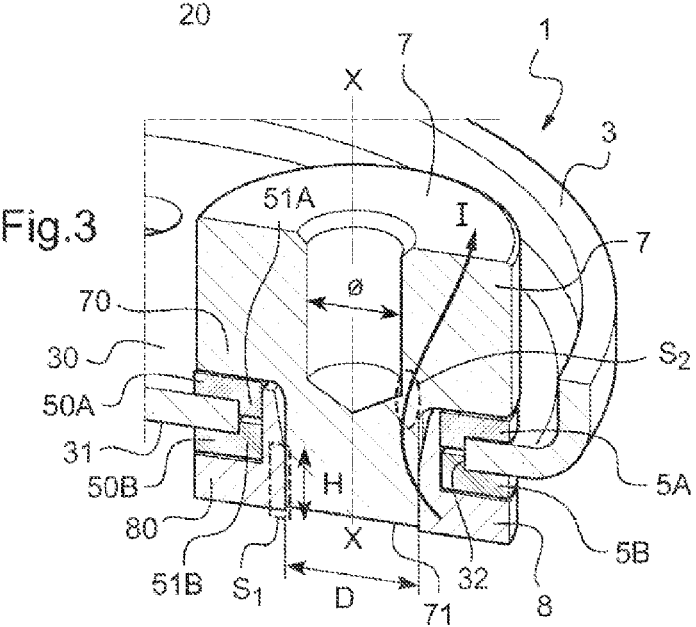
FIG. 3 is a perspective view in axial section of a bushing forming a terminal of an Li-ion storage battery according to one example according to the invention.

FIG. 3 represents an example of a bushing forming a terminal 1 of an Li-ion storage battery, according to the invention.

The bushing 1 according to the invention is formed through an orifice 32 opening on either side of a cover 3 of an Li-ion storage battery housing. This cover comprising two opposite faces 30, 31. The bushing 1 extends along an axis X parallel to the axis of the housing of the Li-ion storage battery.

The bushing 1 according to the invention firstly comprises two identical electrically insulating washers 5A, 5B. The washers 5A, 5B represented have a high electrical resistivity coefficient, greater than $1.10^{15}$ μohm·cm. They may be made of polyetherimide PEI. Each washer comprising a bearing portion 50A, 50B and a guiding portion 51A, 51B projecting from the bearing portion. The bearing portion of the upper washer 5A bears with its surface under pressure against the upper face 30 of the cover 3, and its guiding portion 51A bears with pressure against the edge of the orifice 32 of the cover 3. Similarly, the bearing portion of the lower washer 5B bears with its surface under pressure against the lower face 30 of the cover 3, and its guiding portion 51B bears with pressure against the edge of the orifice 32 of the cover 3.

The bushing 1 according to the invention comprises a male piece 7 fitted tightly in a female piece 8. The male piece 7 represented is internally threaded, typically according to a diameter Ø of the M5 type. The male 7 and female 8 pieces represented are electrically conductive: in other words, they have a low electrical resistivity coefficient, typically between 1.7 and 1.9 µohm·cm. They may be made of electrolytic copper CuAl or of copper weakly alloyed with tellurium, CuTe. They may also consist of the same material as the cover 3, typically aluminum 1050 or 3003, the electrical resistivity coefficient of which is of the order of 2.6 µohm·cm. In this case, care is of course taken so that the material is chemically compatible with the materials constituting the electrochemical cell or cells of the Li-ion storage battery contained in the housing. Preferably, these male 7 and female 8 pieces are made of the same material.

Each of the male 7 and female pieces comprises a bearing portion 70, 80. The bearing portion 70 of the male piece 7 bears with its surface under pressure against the bearing portion 50A of the upper washer 5A, while the bearing portion 80 of the female piece bears with its surface under pressure against the bearing portion 50B of the lower washer 5B. As illustrated in FIG. 3, the female piece 8 furthermore bears with its surface under pressure against the guiding portions 51A, 51B of the washers.

According to the invention, the material(s) of the male 7 and female 8 pieces is (are) selected, and their cross sections are dimensioned, in order to allow an electric current with a value at least equal to 100 A to flow through. This heavy current capable of flowing through a bushing 1 according to the invention is a continuous current for a duration of at least 3 minutes.

The path of a current I with more than 100 A through the bushing 1 according to the invention has been symbolized by the black arrowed line.

The dimensioning of the male 7 and female 8 pieces represented in FIG. 3 relates to the length dimensions of each of the pieces 7, 8, the contact height H between the two pieces 7, 8, defining a cross section S1 symbolized by a dashed rectangle, and lastly the wall thickness on the female piece 8, defining a cross section S2 symbolized by a dashed circle. It is to be pointed out that the cross section S1 is a band of height H on the periphery of the male piece 7, i.e. $S1=\pi*H*D$. Likewise, S2 corresponds to the smallest cross section of the male piece 7, that is to say transversely to its axis X, level with the bore of diameter Ø.

Preferably, S1 is greater than 8 mm², more preferably greater than 10 mm². Preferably, S2 is greater than 8 mm², more preferably greater than 10 mm².

A plurality of bushings 1 were produced as illustrated in FIG. 3, but according to different dimensionings Nos 1 to 4. These, as well as the various values of current I which can flow through the bushing 1, are indicated in the table below, given on the one hand that the diameter D corresponds to that of the part of the male piece 8 which defines the contact height H with the female piece 7, and on the other hand that the current I must be continuous for a duration of at least 3 minutes.

| Dimensioning of the bushing according to the invention | No. | | | |
| --- | --- | --- | --- | --- |
| | 1 | 2 | 3 | 4 |
| Diameter D in mm | 6.0 | 7.0 | 8.0 | 9.0 |
| Cross section S1 in mm² | 14.3 | 26.0 | 40.5 | 56 |
| Cross section S2 in mm² | 40 | 52 | 60 | 67 |
| Current I in A | 200-230 | 320-360 | 450-500 | >500 |

Tests were carried out on a bushing with dimensioning No. 1, that is to say with a diameter D equal to 6 mm, in order to corroborate the selection of the materials and the dimensioning of their cross sections. These tests consisted in making various current levels flow, respectively ranging from 50 to 500 A, increasing at intervals of 50 A to change from one level to the other. Measurements were then made of the heating observed in the bushing as a function of time, that is to say its temperature rise counting from the initial instant at which the current I is delivered through the female piece 8 and flows as symbolized in FIG. 3. It is to be pointed out that these tests were carried out for a bushing 1 according to the invention forming a negative terminal. It is to be pointed out that, for these tests, the male 7 and female pieces are made of CuAl, the washers are made of PEI and the wall 3 is made of aluminum 1050.

Figure 4:
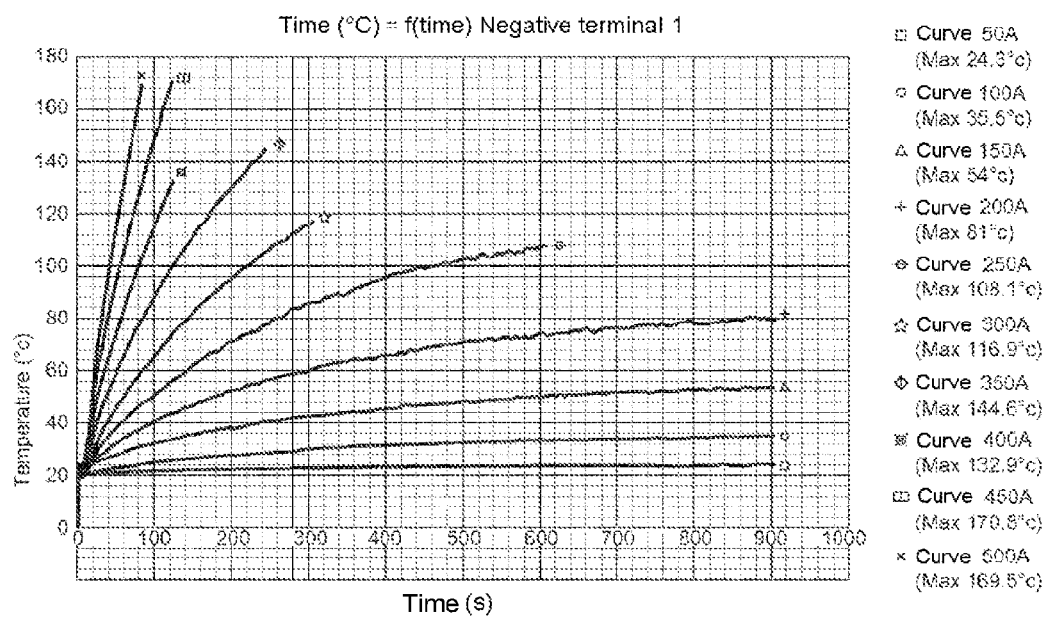
FIG. 4 illustrates the curves of the variation in temperature as a function of time according to the example of FIG. 3 and with different dimensionings.
Figure 4A:
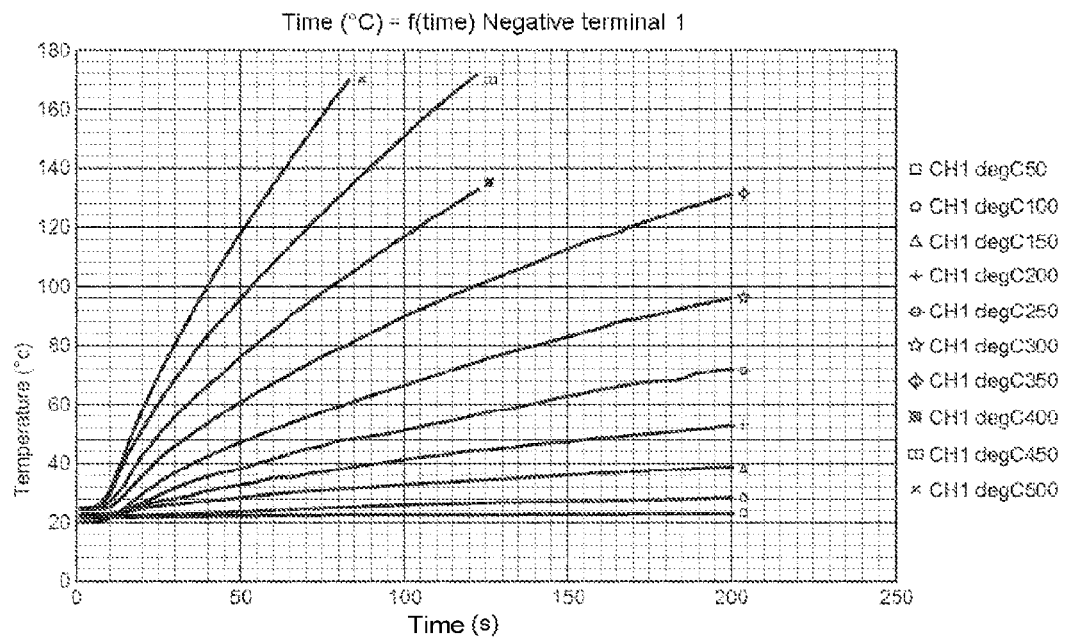
FIG. 4A is an enlarged view of FIG. 4.

The various curves shown in FIGS. 4 and 4A illustrate the results of these heating measurements.

From these curves, it can be seen that, with a current of 200 A, the temperature rise measured is about 30° C., and that with a current of 250 A it is about 50° C.

It may be concluded therefrom that these measurement results show that it is possible for a bushing 1 with dimensioning No. 1 to carry:
very heavy currents up to at least 500 A;
heavy currents of between 200 and 250 A continuously for a consequent duration without excessive temperature rise, which furthermore has a tendency to stabilize after a certain amount of time.

In order to produce a bushing according to the invention, the following steps are carried out.

One of the guiding portions 51A, 51B of the washers 5A, 5B is inserted through the orifice 32, from each of the two faces 30, 31 of the cover 3, in such a way that they bear against the edge of the orifice 32.

The female piece 8 is inserted into the lower washer 5B from the lower face 31 of the cover 3.

The male piece 7 is force-fitted from the upper face 30 opposite the lower face 31 of the cover 3. The force-fitting makes it possible to have each of the bearing portions 70, 80 of the male 7 and female pieces 8 bearing with its surface under pressure against a bearing portion 50, 50B of the washers 5A, 5B, itself bearing under pressure against the edge of the orifice 32. Furthermore, the female piece 8 bears under pressure against the guiding portions 51A, 51B of the washers 5A, 5B, themselves bearing with their surface under pressure against the edge of the orifice 32.

Various tests under pressure were carried out with various forces applied for the force-fitting. These tests showed that it is preferable to apply a force-fitting force at least equal to 1 metric ton-force in order to obtain on the one hand perfect leaktightness between the pieces 7, 8, washers 5A, 5B and cover 3, and on the other hand very strong cold mechanical tightening between the male 7 and female 8 pieces.

Figure 5:
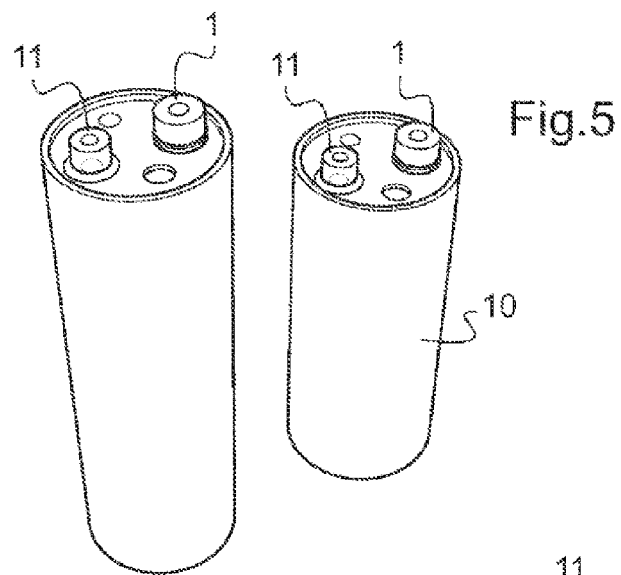
FIG. 5 is a perspective view of a cylindrical housing of an Li-ion storage battery, with a cover through which a bushing forming a terminal according to the invention is formed.
Figure 5A:
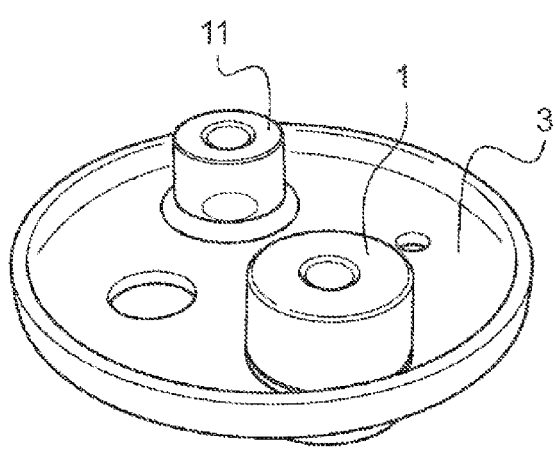
FIGS. 5A and 5B are perspective views respectively from above and from below of a cover with a circular cross section fixed on a housing of FIG. 5.
Figure 5B:
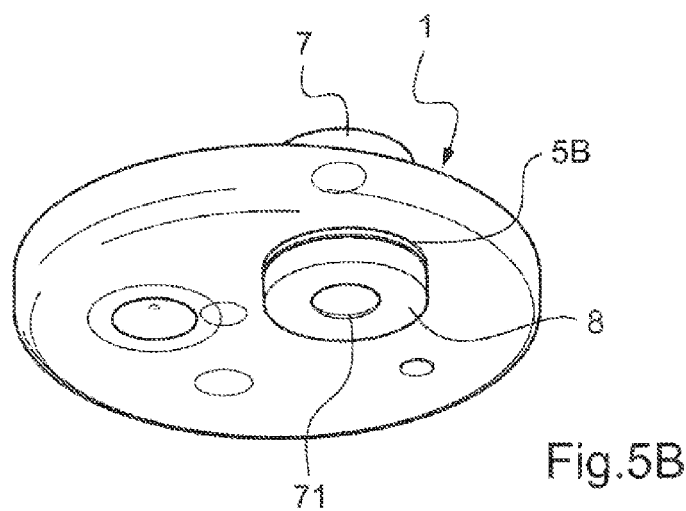
Figure 5C:
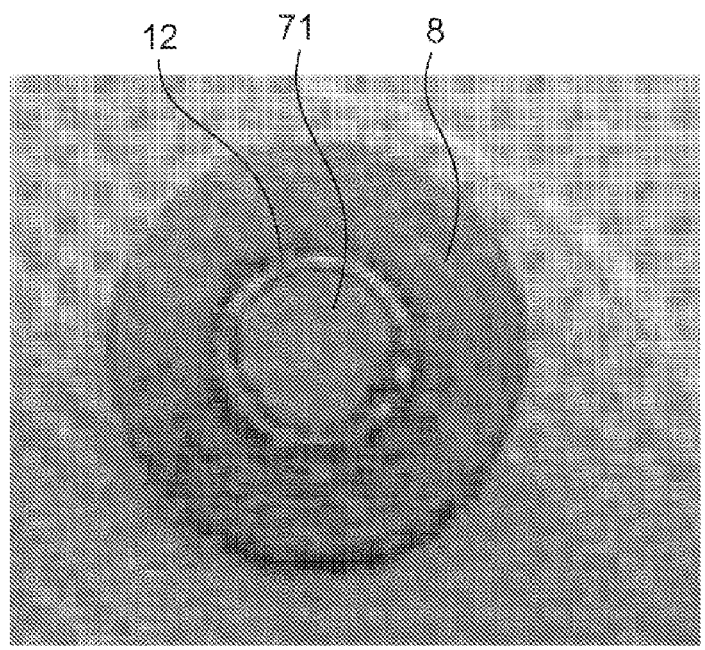
FIG. 5C is a reproduction of a photograph from below of a cover with a circular cross section fixed on a housing such as according to FIG. 5.
Figure 6:
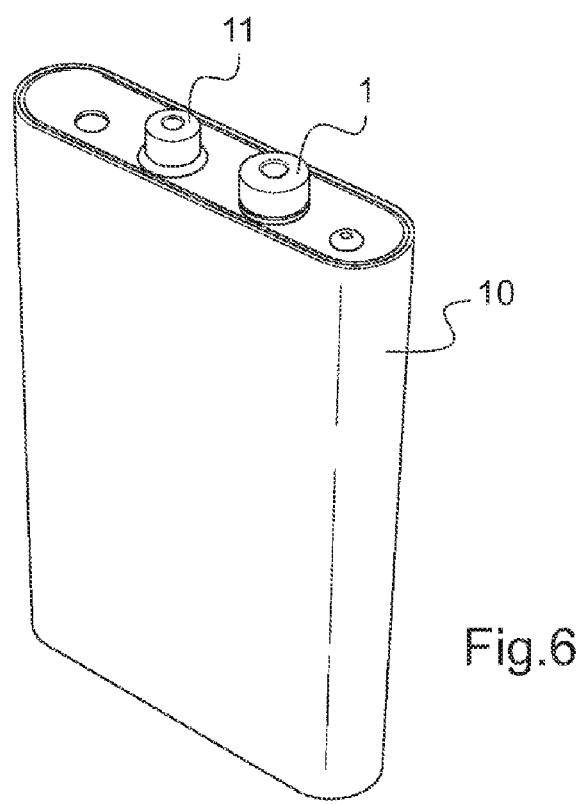
FIG. 6 is a perspective view of a prismatically shaped housing of an Li-ion storage battery, with a cover through which a bushing forming a terminal according to the invention is formed.

The bushing 1 according to the invention may be formed on a cover 3 of a housing 10 of an Li-ion storage battery both according to a cylindrical geometry (FIGS. 5 to 5C) and according to a prismatic geometry (FIG. 6). In these various configurations, the terminal 1 according to the invention is for example negative, it being possible for the positive terminal 11 to be produced, for example, directly by welding, likewise on the cover 3, as illustrated in FIGS. 5 to 6.

In order to further reinforce the mechanical connection between the male 7 and female 8 pieces, it is advantageous to form a continuous leaktight weld bead 12 at the periphery and at the emergent end 71 of the male piece 7, as illustrated in FIG. 5C. This continuous bead 12 may be produced by electrical welding or laser welding. This continuous bead 12 supplements and ensures perfect leaktightness of the bushing 1 according to the invention, and does so throughout the working life of the Li-ion storage battery, which is preferably more than 5 years.

Although not mentioned above, it is ensured that the base of the female piece 8, that is to say the cross section which defines its bearing surface 80, has a sufficient area to be able to electrically connect a connection means internal to the housing and itself electrically connected to the electrochemical assembly, usually referred to as a bundle, consisting of one or more electrochemical cells. Electrical connection between the internal connection means and the base 80 of the female piece may be produced by welding.

The invention is not limited to the examples described above; in particular, characteristics of the examples illustrated may be combined with one another in the scope of variants which are not illustrated.

The expression "comprising one" should be understood as being synonymous with "comprising at least one", unless the contrary is indicated.

The invention claimed is:

1. A bushing forming a terminal for a lithium-ion (Li-ion) storage battery, formed through an orifice opening on either side of a wall having two opposite faces, comprising:
    two electrically insulating washers, each having a bearing portion bearing with its surface under pressure against one of the faces of the wall, and a guiding portion projecting from the bearing portion, the guiding portion bearing with pressure against the edge of the orifice of the wall,
    two electrically conductive pieces, of which a male piece is fitted tightly in the female piece, each of the conductive pieces having a bearing portion bearing with its surface under pressure against a bearing portion of the washers, the female piece furthermore bearing with its surface under pressure against the guiding portions of the washers, wherein radial tightening of the male and female pieces between one another and of the two insulating washers between the female piece and the edge of the orifice ensures leaktightness, wherein the female piece is open and is welded by a continuous weld bead to the male piece on the emergent end of the latter,
in which bushing the material(s) of the pieces is (are) adapted, and their cross sections are dimensioned, in order to allow an electric current with a value at least equal to 100 A to flow through.

2. The bushing as claimed in claim 1, wherein the material(s) of the pieces is (are) adapted, and their cross sections are dimensioned, in order to allow an electric current with a value at most equal to 500 A to flow through.

3. The bushing as claimed in claim 1, wherein the male and female pieces are made of the same material.

4. The bushing as claimed in claim 3, wherein the male and female pieces are made of electrolytic copper, copper alloyed with aluminum (CuAl), or copper alloyed with tellurium (CuTe).

5. The bushing as claimed in claim 1, wherein the insulating washers are made of polyetherimide (PEI).

6. The bushing as claimed in claim 1, wherein the contact cross section S1 between the male piece and the female piece is greater than 8 mm$^2$.

7. The bushing as claimed in claim 1, wherein the smallest cross section S2 of the male piece is greater than 8 mm$^2$.

8. A lithium-ion (Li-ion) battery or storage battery comprising a housing with a cover through which a bushing as claimed claim 1 is formed.

9. The Li-ion battery or storage battery as claimed in claim 8, wherein the male piece is of the internally threaded type and projects outside the housing.

10. The Li-ion battery or storage battery as claimed in claim 8, wherein the cover comprises aluminum.

11. The Li-ion battery or storage battery as claimed in claim 8, wherein:
    the material of the negative electrode(s) is selected from the group comprising graphite, lithium, titanate oxide $Li_4TiO_5O_{12}$;
    the material of the positive electrode(s) is selected from the group comprising $LiFePO_4$, $LiCoO_2$, $LiNi_{0.33}Mn_{0.33}Co_{0.33}O_2$.

12. A method for producing a bushing as claimed in claim 1, according to which the following steps are carried out:
    a/ insertion through the orifice, from each of the two opposite faces of the wall, of one of the guiding portions of the washers, in such a way that they bear against the edge of the orifice of the wall,
    b/ insertion, from one face of the wall, of the female piece which is open into one of the washers;
    c/ force-fitting, from the opposite face of the wall, of the male piece, in such a way that each of the bearing portions of the male and female pieces bears with its surface under pressure against a bearing portion of the washers, which itself bears with pressure against the edge of the orifice, the female piece furthermore bearing with pressure against the guiding portions of the washers, which themselves bear with their surface under pressure against the edge of the orifice of the wall, wherein radial tightening of the male and female pieces between one another and of the two insulating washers between the female piece and the edge of the orifice ensures leaktightness; and
    d/ welding, by a continuous weld bead, the female piece to the male piece on the emergent end of the latter.

13. The method as claimed in claim 12, wherein the force-fitting according to step c/ is carried out by pressing with a force greater than or equal to 1 metric ton-force.

14. The bushing as claimed in claim 6, wherein the contact cross section S1 between the male piece and the female piece is greater than 10 mm$^2$.

15. The bushing as claimed in claim 7, wherein the smallest cross section S2 of the male piece is greater than 10 mm$^2$.

16. The Li-ion battery or storage battery as claimed in claim 10 wherein the cover comprises aluminum 1050 or aluminum 3003.

* * * * *